UNITED STATES PATENT OFFICE.

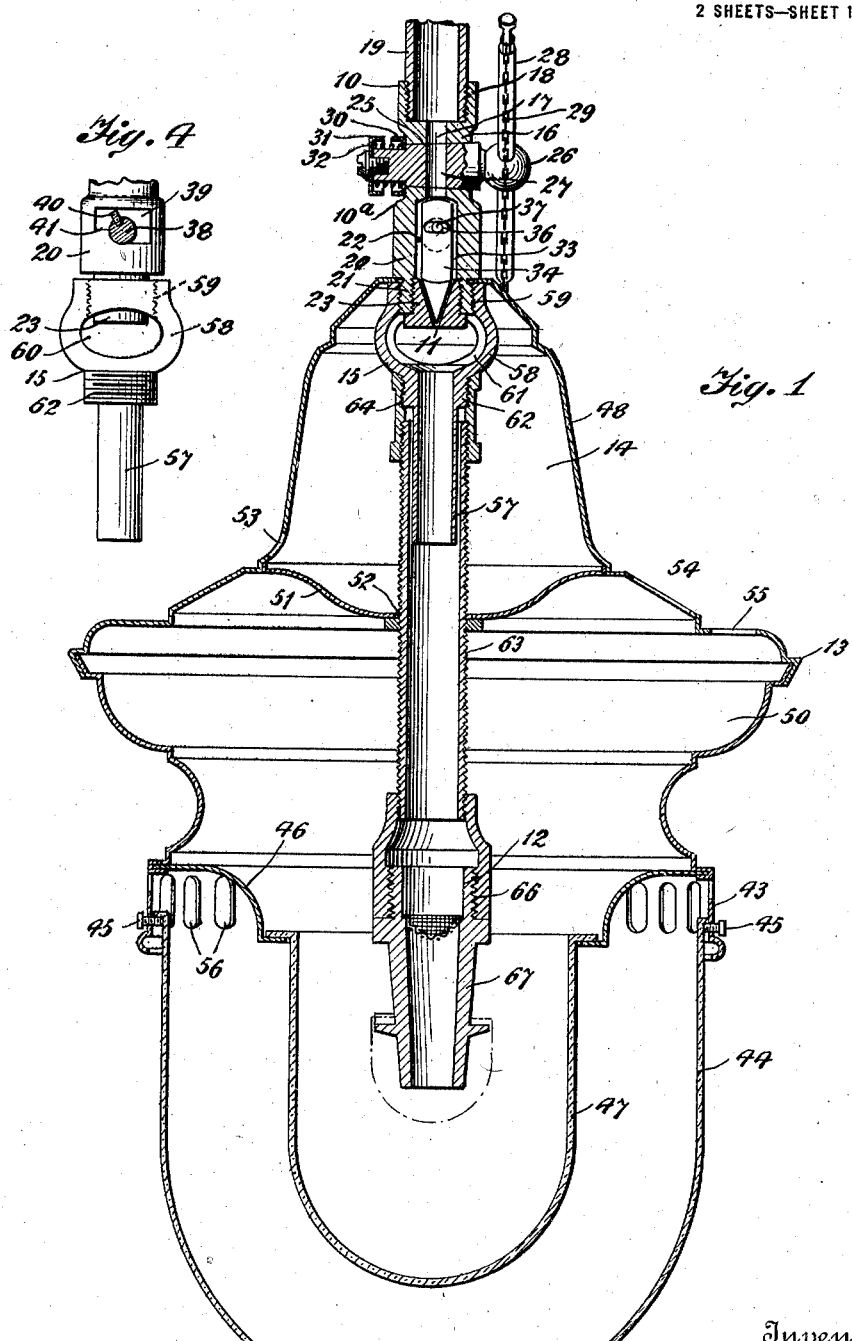

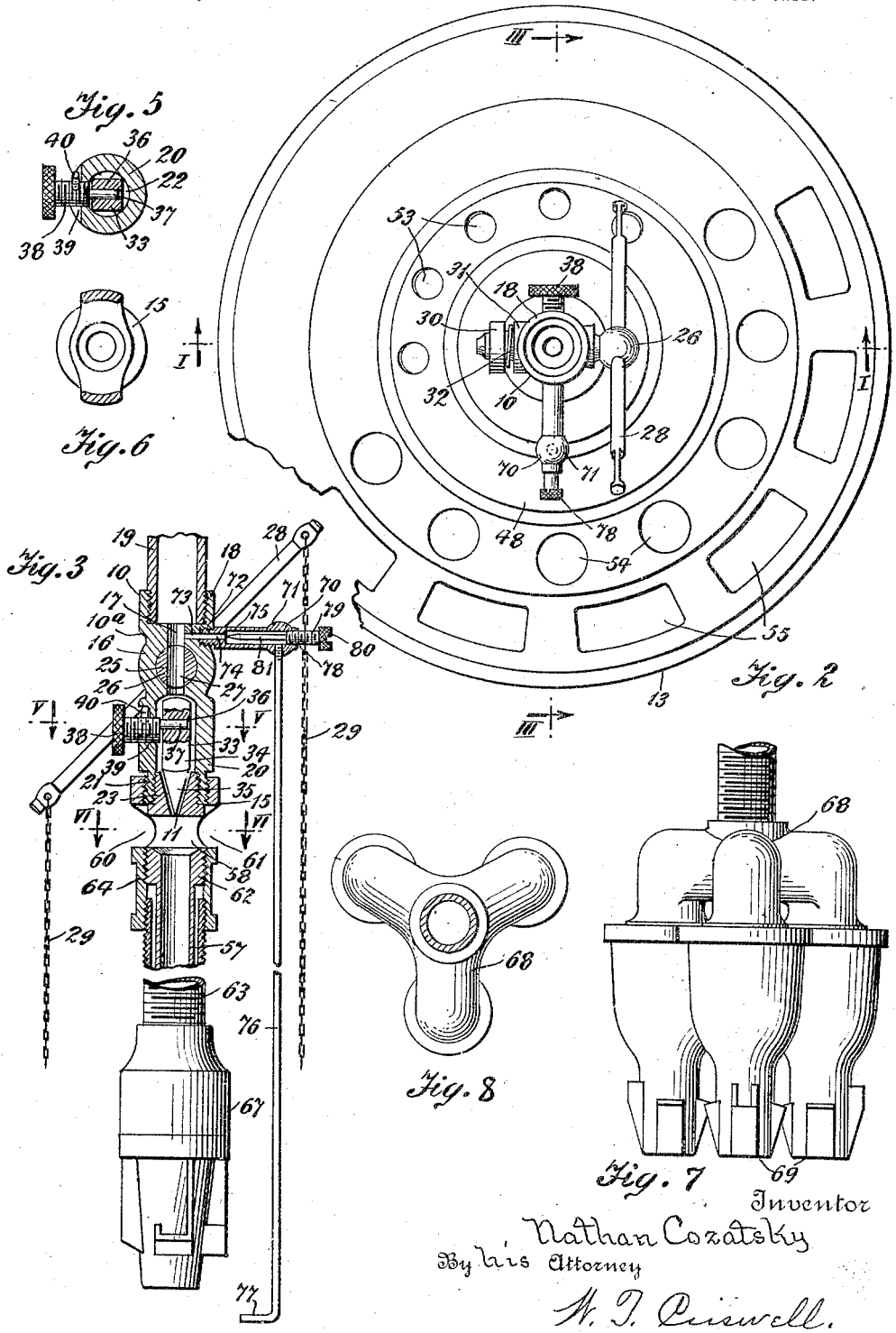

NATHAN COZATSKY, OF NEW YORK, N. Y., ASSIGNOR TO CLUSTER APPLIANCE GAS LAMP CO., OF NEW YORK, N. Y., A FIRM COMPOSED OF NATHAN ROSEN AND ABRAHAM TANNEN.

GAS-LAMP.

1,302,901. Specification of Letters Patent. Patented May 6, 1919.

Application filed September 12, 1916. Serial No. 119,668.

*To all whom it may concern:*

Be it known that I, NATHAN COZATSKY, a citizen of the United States, and a resident of New York, borough of Bronx, county of Bronx, and State of New York, have invented a certain new and useful Improvement in Gas-Lamps, of which the following is a full, clear, and exact specification.

This invention relates to a class of gas lighting apparatus.

My invention has for its object primarily to provide an apparatus, or lamp adapted to be employed for permitting buildings and other places to be lighted with gas, and which is of a form whereby a minimum quantity of gas will be consumed for effectually lighting a given area of space. The invention consists essentially of a valve-controlled feeder, or casing adapted to be applied to a source of gas supply, and the feeder has a valve-regulated outlet leading to a burner tip, the outlet being formed so that gas will flow therethrough in a small stream. On the feeder is an air chamber, and in the chamber interposed between the outlet and the burner tip is a mixer formed with a passage leading to the tip as well as having a transverse passage so that air in the chamber will circulate crosswise of the stream of gas during its delivery to the tip for charging the gas with air previous to its ignition.

Another object of the invention is to provide a valve-controlled pilot whereby a small jet of ignited gas may be maintained for conveniently lighting at the burner tip the gas when turned-on; and a further object of the invention is to provide an efficient and durable gas lamp whereby a single light, or a cluster of lights may be produced.

A practical embodiment of the invention is represented in the accompanying drawings forming a part of this specification in which similar characters of reference indicate corresponding parts in all the views, the said invention being more fully described hereinafter, and then pointed out in the claims at the end of the description.

In the drawings, Figure 1 is a sectional view, partly fragmentary and partly in detail, taken on the line I—I of Fig. 2 of one form of gas burner embodying my invention.

Fig. 2 is a top plan, partly broken away, of the gas burner.

Fig. 3 is a fragmentary sectional view, partly in detail and partly broken away, taken on the line III—III of Fig. 2, with the hood removed therefrom.

Fig. 4 is a fragmentary view showing an elevation of the air mixer employed in the burner.

Fig. 5 is a sectional view, partly in detail, taken on the line V—V of Fig. 3.

Fig. 6 is a detail sectional view taken on the line VI—VI of Fig. 3.

Fig. 7 is a fragmentary view showing an elevation of a cluster of burner tips which may be used in conjunction with the burner, and Fig. 8 is a top plan, partly in section, of the cluster of burner tips shown in Fig. 7.

The lamp, or apparatus is composed mainly of a valve-controlled gas feeder 10 having a casing $10^a$ with a valve-regulated outlet 11 leading to a burner tip 12. On the casing $10^a$ is a hood 13 provided with an air chamber 14, and in the air chamber communicating with the outlet and the burner tip is a mixer 15 for permitting the gas to be charged with air previous to delivery to the burner tip, all of which may be made of any desired material and in any suitable shapes and sizes.

The casing $10^a$ of the feeder has a body 16 of preferably a tubular form with a vertically disposed passage, or inlet 17 therethrough, and on the top of this body is an interiorly threaded upwardly extending boss 18 to allow the casing to be screwed on the exteriorly threaded pipe, as 19, leading from a source of supply for delivery of gas to the passage, or inlet 17. On the lower end of the body 16 is an enlarged downwardly projecting part 20 with an exteriorly and interiorly threaded annular flange 21 on its underside. In the enlarged part 20 of the body is a recess 22 communicating with the lower end of the passage 17 as well as communicating with the passage through the annular flange 21, and this recess is of larger diameter than the diameter of the inlet. In the annular flange 21 is threaded a plug 23 having a passage forming the outlet 11 in communication with the lower end of the recess 22, and this outlet is tapered downwardly in a V-shape, in cross-section, so that its apex will be of a small diameter for delivering gas in a fine stream from the inlet 17 and the recess 22 of the body of the casing 10ª. Transversely through the body 16 of the casing is a slightly tapered opening 25 communicating with the inlet 17 of the body, and rotatable in this opening is a valve 26 of a length so that both of its ends extend beyond opposite parts of the body. Crosswise through the central part of the valve 26 is a passage 27 adapted when the valve is accordingly turned to be alternately registered and moved out of register with the passage, or inlet 17 and with the recess 22 for admitting and cutting-off the feed of gas from the source of supply to the outlet 11. On one end of the valve is held the central part of a bar, or handle, as 28, of a length whereby its ends extend in opposite lateral directions some distances beyond the body to allow the valve to be partially rotated when the ends of the handle are moved upwardly and downwardly the required distances to operate the valve for opening and closing the passage, or inlet 17, as will be hereinafter more fully explained, and to the ends of this handle may be attached the ends of a chain, or line, as 29, of a length so that its central part will depend a desired distance below the apparatus to allow the handle to be manually operated especially when the apparatus is positioned at a height inconvenient to ordinarily reach. On the second projecting end of the valve 26 may be arranged two spaced rings, as 30 and 31, and encircling the valve between these rings is a spiral spring 32 normally serving to revolubly retain the valve in the body of the casing. In the recess 22 of the body is a valve 33 for regulating the discharge of gas through the outlet 11, and this valve is preferably in the form of a post 34 adjustably movable in the recess, while the lower end of the post is tapered, at 35, to conform with the shape of the V-shaped outlet 11, this tapered end of the valve being movably disposed in the outlet for serving to open and close the outlet. Transversely through the upper part of the post 34 is a hole 36 in which is rotatably disposed a pin 37 projecting eccentrically from the free end of a finger screw, as 38, revoluble in an opening 39 provided through the enlarged part 20 of the casing 10ª. The finger screw is of a length to extend a slight distance beyond the casing so as to be readily turned, and to limit the rotation of the finger screw projecting from the central part of the screw is a short pin, or lug 40 adapted to be moved into engagement with a shoulder 41, Fig. 4, provided by reducing a part of the opening 39 so that when the screw is turned to move the tapered end 35 of the valve 33 into contact with the wall of the outlet 11 to close the outlet this lug will engage the shoulder to prevent the point of the valve from penetrating through the open apex of the outlet, and by reversely rotating the finger screw the post of the valve will be moved upwardly to raise its tapered end for opening the outlet.

Encircling the annular flange 21 at its juncture with the casing 10ª of the feeder is the hood or bracket 13 preferably of somewhat the shape of an inverted bowl which may be of an attractive ornamental design, as shown, and on the lower end of the hood is a depending annular flange 43 for reception of a hanging globe, as 44, of glass or other transparent or translucent material which may be removably held to the flange by a number of screws 45 being threaded through openings in the flange so as to engage the globe. In the lower open end of the hood 13 may be a transversely disposed second annular flange, or ring-shaped plate 46 which supports a second, or inner hanging transparent, or translucent globe 47 in spaced relation to the outer globe. The lower open end of the hood is thereby closed, and the upper part of the hood is considerably reduced in diameter, as at 48. The interior of the hood 13 is divided into the upper, or air chamber 14, and a lower chamber, as 50, by a transverse partition or plate 51 which is removably held at the juncture of the reduced part 48 with the lower part of the hood, and centrally through this partition is an opening 52 in register with the outlet 11 of the feeder 10 as well as being on a line corresponding with the center of the ring-shape plate 46 of the hood. To cause air to circulate in the chamber 14 of the hood in the lower part of the wall of this chamber are a number of spaced openings 53, and to allow the escapement of heated air from the lower chamber 50 of the hood through the wall of this chamber may be a number of rows of spaced openings 54 and 55, while heated air from the space between the outer globe 44 and the inner globe 47 may escape through a number of spaced openings 56 provided in the depending flange 43 of the hood.

In the air chamber 14 at the outlet 24 of the feeder 10 is arranged the mixer 15 for charging the gas with air previous to ignition. The air mixer 15 is preferably formed of a tube 57 having on its upper end a hollow head, as 58, of somewhat an oval-shape of larger dimensions than the diameter of the tube, and the interior of the head communicates with the passage through the tube. Through the top of the hollow head 58 is a threaded opening 59 in which is screwed the annular flange 21 of the casing 10ª of the feeder so that the gas fed through the outlet 11 will flow through the interior of the head and through the passage of the tube 57. Transversely through opposite parts of the wall of the head 58 are registered openings 60 and 61 so that air from the chamber 14 will circulate crosswise of the stream of gas delivered from the outlet 11 to the passage through the tube 57 to charge the gas with air, and on the underside of the head is an exteriorly threaded shoulder 62 overhanging the upper part of the tube. On the lower end of the tube 57 of the mixer 15 is disposed the upper exteriorly threaded end of a pipe 63, and this pipe may be connected to the mixer by a sleeve 64 which is screwed on this threaded end of the pipe as well as being screwed on the shoulder 62 of the mixer. The pipe 63 is thereby downwardly disposed, and this pipe is of a length so as to pass through the opening 52 of the plate 51 into the lower part of the chamber 50 of the hood 13 where it terminates with the burner tip 12. The pipe 63 at its tip 12 may be exteriorly threaded, as at 66, to permit a single holder of a suitable form, as 67, for supporting a gauze mantle to be detachably fastened thereto, or to allow a bracket, as 68, having a cluster of mantle holders, as 69, to be detachably fastened to the pipe so that the mantles will be arranged within the globes of the hood 13.

In order to allow a small jet of ignited gas to be maintained, as is common with lamps of this class, for conveniently lighting the mixture of gas and air at the burner tip, I provide a pilot, as 70. The pilot 70 has a tubular casing, as 71, with one of its ends exteriorly threaded, as at 72, and this end is screwed in a threaded opening 73 leading into the passage, or inlet 17 above the valve 26 of the feeder 10 so that the tubular casing extends laterally from the feeder. The interior of the casing 71 is so formed that the part of its passage, as 74, which is contiguous to the opening 73 of the casings of the feeder is considerably less in diameter than the second part, as 75, of the passage, and the wall of this second part of the passage is threaded. Connected to the underside of the casing 71, leading from the enlarged part 75 of the passage of the casing, is a depending delivery pipe 76 of a length to extend slightly below the free end of the mantle holder when arranged on the burner tip 15, the pipe being preferably disposed through openings provided in the hood 13 of the lamp, and the lower end of this delivery pipe may be angularly bent, as at 77, so that the outlet of the bent end of the pipe will be contiguous to the outlet of the mantle holder. In practice a portion of the gas delivered from its source of supply into the inlet 17 of the feeder 10 will flow through the opening 73 of the casing of the feeder, through the passages of the casing 71 of the pilot, and through the pipe 76 for ignition at the tip of the bent end 77 of the pipe, and by making this delivery pipe of a limited size a very small jet of light will be maintained for lighting the gas when turned-on for delivery through the lamp. To regulate the flow of gas through the pilot, in the interiorly threaded end of the casing 71 is a valve 78 formed with a threaded stem 79 which is screwed in the threaded end of the casing, and on the outer end of the stem is a head, as 80, to allow the valve to be adjusted inwardly and outwardly of the casing. Projecting from the end of the stem 79 interiorly of the casing is a needle point, as 81, which is of a size as well as being arranged so as to close, or allow the part 74 of the passage of the casing 71 to be opened when the valve 78 is accordingly adjusted.

To operate the lamp following the lighting of the pilot, as described, after the valve 78 is suitably adjusted for a continuous feed of gas to the pilot light, the chain, or line 29 is pulled to guide the bar 28 for rotating the valve 26 to open the inlet 17 of the feeder 10. The valve 33 is adjusted by operating the screw 38 to suitably open the outlet 11, and the gas will then flow from its source of supply through the inlet 17, through the valve 26, through the recess 22, and through the outlet 11 into the head of the mixer 15 for being charged with air circulating cross the stream of gas through the openings 60 and 61 of the mixer. The mixed air and gas will then flow through the tube 57 of the mixer, through the pipe 63, through the tip 67, and through the mantle, or mantles supported on the pipe so as to be ignited by the light of the pilot 70. In this manner a simple and efficient lamp is provided whereby buildings and other places may be effectually and economically lighted with gas.

In the foregoing description, I have embodied the preferred form of my invention, but I do not wish to be understood as limiting myself thereto, as I am aware that modifications may be made therein without departing from the principle, or sacrificing any of the the advantages of this invention, therefore I reserve to myself the right to make such changes as fairly fall within the scope thereof.

Having thus described my invention, I claim as new and desire to secure by Letters Patent:—

1. In a gas lamp, a flared hood adapted to be suspended from the feeder of the lamp and having an angularly flanged lower end providing an annular horizontal portion with a vertical cylindrical portion depending therefrom, a horizontal plate-like member disposed within said vertical cylindrical portion with its outer margin flatly secured against the under face of said annular horizontal portion, said plate-like member being provided with a relatively large circular central opening surrounded by a horizontal annular globe-supporting flange, and globe supporting means carried by the lower end of said vertical cylindrical portion.

2. A gas lamp including a valve controlled and regulated feeder provided with means at its upper end to connect the same to a gas supply pipe and having its lower end threaded and reduced to provide a shoulder, a depending flared hood provided with an opening in its upper end through which the reduced end of the feeder freely projects, a transversely apertured mixer having its upper end threaded on said reduced end of the feeder to clamp said upper end of the hood between the adjacent upper end thereof and said shoulder, a transverse partition secured within said hood below said mixer dividing said hood into upper and lower chambers, said hood being apertured adjacent said partition above and below the latter, a pipe detachably and adjustably connected to the lower end of said mixer and extending downwardly through said partition to a point adjacent the lower end of said hood, a burner tip carried by the lower end of said pipe, and globe supporting means carried by the lower end of said hood.

This specification signed and witnessed this 11th day of September, A. D. 1916.

NATHAN COZATSKY.

Witnesses:
 GEORGE F. BENTLEY,
 N. RORA.

Copies of this patent may be obtained for five cents each, by addressing the "Commissioner of Patents. Washington, D. C."